(12) United States Patent
Quibria et al.

(10) Patent No.: US 10,522,144 B2
(45) Date of Patent: Dec. 31, 2019

(54) METHOD OF AND SYSTEM FOR PROVIDING ADAPTIVE RESPONDENT TRAINING IN A SPEECH RECOGNITION APPLICATION

(71) Applicant: ELIZA Corporation, Danvers, MA (US)

(72) Inventors: Nasreen Quibria, Newton, MA (US); Lucas Merrow, York, ME (US); Oleg Boulanov, Beverly, MA (US); John P. Kroeker, Hamilton, MA (US); Alexandra Drane, Glendale, MA (US)

(73) Assignee: ELIZA CORPORATION, Danvers, MA (US)

( * ) Notice: Subject to any disclaimer, the term of this patent is extended or adjusted under 35 U.S.C. 154(b) by 0 days.

(21) Appl. No.: 15/911,965

(22) Filed: Mar. 5, 2018

(65) Prior Publication Data
US 2018/0197541 A1  Jul. 12, 2018

Related U.S. Application Data

(63) Continuation of application No. 15/438,067, filed on Feb. 21, 2017, now abandoned, which is a
(Continued)

(51) Int. Cl.
*G10L 15/22* (2006.01)
*H04M 3/46* (2006.01)
(Continued)

(52) U.S. Cl.
CPC ............ *G10L 15/22* (2013.01); *G10L 15/063* (2013.01); *H04M 3/46* (2013.01); *H04M 3/4936* (2013.01);
(Continued)

(58) Field of Classification Search
CPC ...... G09B 5/04; G10L 15/26; G10L 2015/228; G10L 17/24; G10L 2015/223;
(Continued)

(56) References Cited

U.S. PATENT DOCUMENTS

| 4,625,081 A | 11/1986 | Lotito et al. |
| 4,667,065 A | 5/1987 | Bangerter |

(Continued)

FOREIGN PATENT DOCUMENTS

| EP | 0895396 | 3/1999 |
| WO | 9850907 | 11/1998 |

OTHER PUBLICATIONS

International Search Report from Corresponding International Application No. PCT/US01/32425 dated Mar. 1, 2002.
(Continued)

*Primary Examiner* — Huyen X Vo
(74) *Attorney, Agent, or Firm* — Perkins Coie LLP (57) ABSTRACT

A system for conducting a telephonic speech recognition application includes an automated telephone device for making telephonic contact with a respondent and a speech recognition device which, upon the telephonic contact being made, presents the respondent with at least one introductory prompt for the respondent to reply to; receives a spoken response from the respondent; and performs a speech recognition analysis on the spoken response to determine a capability of the respondent to complete the application. If the speech recognition device, based on the spoken response to the introductory prompt, determines that the respondent is capable of competing the application, the speech recognition device presents at least one application prompt to the respondent. If the speech recognition device, based on the spoken response to the introductory prompt, determines that the respondent is not capable of completing the application,
(Continued)

the speech recognition system presents instructions on completing the application to the respondent.

18 Claims, 5 Drawing Sheets

Related U.S. Application Data continuation of application No. 13/052,412, filed on Mar. 21, 2011, now Pat. No. 9,578,169, which is a continuation of application No. 11/273,528, filed on Nov. 14, 2005, now Pat. No. 7,933,775, which is a continuation of application No. 09/978,611, filed on Oct. 16, 2001, now abandoned.

(60) Provisional application No. 60/241,757, filed on Oct. 16, 2000.

(51) Int. Cl.
    *H04M 3/493*     (2006.01)
    *H04M 3/523*     (2006.01)
    *G10L 15/06*     (2013.01)
    *G10L 21/00*     (2013.01)
    *G10L 25/03*     (2013.01)
    *G10L 25/00*     (2013.01)
    *H04M 3/38*     (2006.01)
    *H04M 3/51*     (2006.01)

(52) U.S. Cl.
CPC .............. *H04M 3/523* (2013.01); *G10L 21/00* (2013.01); *G10L 25/00* (2013.01); *G10L 25/03* (2013.01); *H04M 3/382* (2013.01); *H04M 3/5158* (2013.01); *H04M 2201/40* (2013.01); *H04M 2203/2016* (2013.01); *H04M 2203/355* (2013.01)

(58) Field of Classification Search
CPC ... G10L 15/265; G10L 15/07; G10L 15/1822; G10L 2015/225; G10L 21/06; G06F 3/167; G06F 3/0482; G06F 17/00; G06F 17/2881
USPC ................. 704/230–257, 270–275
See application file for complete search history.

(56) References Cited

U.S. PATENT DOCUMENTS

| | | | |
|---|---|---|---|
| 4,785,408 A | 11/1988 | Britton et al. | |
| 4,797,910 A | 1/1989 | Daudelin | |
| 4,866,756 A | 9/1989 | Crane et al. | |
| 4,941,168 A | 7/1990 | Kelly | |
| 4,964,077 A * | 10/1990 | Eisen .................. | G06F 9/453 715/707 |
| 5,027,408 A | 6/1991 | Kroeker et al. | |
| 5,163,083 A | 11/1992 | Dowden et al. | |
| 5,168,524 A | 12/1992 | Kroeker et al. | |
| 5,208,848 A | 5/1993 | Pula | |
| 5,369,685 A | 11/1994 | Kero | |
| 5,404,400 A | 4/1995 | Hamilton | |
| 5,420,912 A | 5/1995 | Kopp et al. | |
| 5,430,792 A | 7/1995 | Jesurum et al. | |
| 5,488,652 A | 1/1996 | Bielby et al. | |
| 5,499,288 A | 3/1996 | Hunt et al. | |
| 5,540,589 A | 7/1996 | Waters | |
| 5,566,272 A | 10/1996 | Brems et al. | |
| 5,572,583 A | 11/1996 | Wheeler et al. | |
| 5,594,638 A | 1/1997 | Iliff | |
| 5,649,057 A | 7/1997 | Lee et al. | |
| 5,652,789 A | 7/1997 | Miner et al. | |
| 5,715,468 A | 2/1998 | Budzinski | |
| 5,719,921 A | 2/1998 | Vysotsky et al. | |
| 5,774,357 A | 6/1998 | Hoffberg et al. | |
| 5,774,525 A | 6/1998 | Kanevsky et al. | |
| 5,774,858 A | 6/1998 | Taubkin et al. | |
| 5,787,151 A | 7/1998 | Nakatsu et al. | |
| 5,797,124 A | 8/1998 | Walsh et al. | |
| 5,828,731 A | 10/1998 | Szlan et al. | |
| 5,832,063 A | 11/1998 | Vysotsky et al. | |
| 5,839,107 A | 11/1998 | Gupta et al. | |
| 5,867,562 A | 2/1999 | Scherer | |
| 5,915,001 A | 6/1999 | Uppaluru | |
| 5,953,393 A | 9/1999 | Culbreth et al. | |
| 5,960,063 A | 9/1999 | Kurolwa et al. | |
| 5,982,875 A | 11/1999 | Lieben et al. | |
| 5,987,414 A | 11/1999 | Sabourin et al. | |
| 6,011,975 A | 1/2000 | Emery et al. | |
| 6,044,347 A | 3/2000 | Abella | |
| 6,073,101 A | 6/2000 | Maes | |
| 6,075,844 A | 6/2000 | Goldberg et al. | |
| 6,081,782 A | 6/2000 | Rabin | |
| 6,094,632 A | 7/2000 | Hattori | |
| 6,101,468 A | 8/2000 | Gould et al. | |
| 6,118,866 A | 9/2000 | Shtivelman | |
| 6,154,526 A | 11/2000 | Dahlke et al. | |
| 6,157,913 A | 12/2000 | Bernstein | |
| 6,173,266 B1 | 1/2001 | Marx et al. | |
| 6,243,684 B1 | 6/2001 | Stuart et al. | |
| 6,269,336 B1 | 7/2001 | Ladd et al. | |
| 6,299,452 B1 * | 10/2001 | Wasowicz ................ | G09B 5/04 434/156 |
| 6,327,343 B1 | 12/2001 | Epstein et al. | |
| 6,334,103 B1 | 12/2001 | Surace et al. | |
| 6,374,225 B1 | 4/2002 | Hejna | |
| 6,375,225 B1 | 4/2002 | Surace et al. | |
| 6,385,584 B1 | 5/2002 | McAllister et al. | |
| 6,405,170 B1 | 6/2002 | Philips et al. | |
| 6,513,009 B1 | 1/2003 | Comerford et al. | |
| 6,560,576 B1 * | 5/2003 | Cohen ..................... | G06F 3/167 704/270 |
| 6,584,179 B1 * | 6/2003 | Fortier .................... | G10L 15/22 379/218.01 |
| 6,604,075 B1 | 8/2003 | Zirngibl et al. | |
| 6,606,596 B1 | 8/2003 | Zirngibl et al. | |
| 6,606,598 B1 | 8/2003 | Holthouse et al. | |
| 6,678,360 B1 | 1/2004 | Katz | |
| 6,704,410 B1 | 3/2004 | McFarlane et al. | |
| 6,707,889 B1 | 3/2004 | Saylor et al. | |
| 6,757,362 B1 | 6/2004 | Cooper et al. | |
| 6,804,332 B1 | 10/2004 | Miner et al. | |
| 6,944,592 B1 | 9/2005 | Pickering | |
| 6,978,238 B2 | 12/2005 | Wohlsen et al. | |
| 7,082,392 B1 | 7/2006 | Butler et al. | |
| 7,137,126 B1 | 11/2006 | Coffman et al. | |
| 7,143,039 B1 | 11/2006 | Stifelman et al. | |
| 7,197,461 B1 | 3/2007 | Eberle et al. | |
| 7,933,775 B2 | 4/2011 | Quibria et al. | |
| 9,578,169 B2 | 2/2017 | Quibria et al. | |
| 2001/0047261 A1 | 11/2001 | Kassan | |
| 2002/0005907 A1 | 5/2002 | Quibria et al. | |
| 2002/0059072 A1 | 5/2002 | Quibria et al. | |
| 2002/0135618 A1 | 9/2002 | Maes et al. | |
| 2002/0143546 A1 | 10/2002 | Layng et al. | |
| 2003/0147518 A1 | 8/2003 | Albal et al. | |
| 2004/0179659 A1 | 9/2004 | Byrne et al. | |
| 2006/0012283 A1 | 6/2006 | Quibria et al. | |
| 2007/0043571 A1 | 2/2007 | Michelini et al. | |
| 2008/0205601 A1 | 8/2008 | Lavoie et al. | |
| 2011/0023119 A1 | 9/2011 | Quibria et al. | |
| 2017/0016220 A1 | 6/2017 | Quibria et al. | |
| 2018/0019754 A1 | 7/2018 | Quibria et al. | |

OTHER PUBLICATIONS

Kamm et al., "The Role of Speech Processing in Human-Computer Intelligent Communication," Speech Communication, Elsevier Science Publishers, Amsterdam, NL, 23:263-278 (1997).

Supplementary European Search Report (EP01981713) dated Aug. 12, 2004.

(56) References Cited

OTHER PUBLICATIONS

Takashashi et al., "Interactive Voice Technology Development for Telecommunications Applications,"Speech Communication, Elsevier Science Publishers, Amsterdam, 17:287-301, ISSN:0167-6393 (1995).

* cited by examiner

METHOD OF AND SYSTEM FOR PROVIDING ADAPTIVE RESPONDENT TRAINING IN A SPEECH RECOGNITION APPLICATION

CROSS REFERENCES TO RELATED APPLICATIONS

This application is a continuation of U.S. patent application Ser. No. 15/438,067 filed Feb. 21, 2017; which is a continuation of U.S. patent application Ser. No. 13/052,412 filed Mar. 21, 2011; which is a continuation of U.S. patent application Ser. No. 11/273,528 filed Nov. 14, 2005; which is a continuation of U.S. patent application Ser. No. 09/978,611 filed Oct. 16, 2001 which claims the benefit of priority from commonly owned U.S. Provisional Patent Application Ser. No. 60/241,757, filed Oct. 16, 2000; all of which are incorporated herein by reference in their entirety.

FIELD OF THE INVENTION

The present invention relates generally to a method of and system for providing adaptive respondent training in a speech recognition algorithm, and more particularly to a method of and system for determining the level of understanding and capability of a respondent to a telephonic speech recognition application, and both providing specific instructions to the respondent regarding the application and adapting the application to suit the capabilities of the respondent.

BACKGROUND OF THE INVENTION

In the new, connected economy, it has become increasingly important for companies or service providers to become more in tune with their clients and customers. Such contact can be facilitated with automated telephonic transaction systems, in which interactively-generated prompts are played in the context of a telephone transaction, and the replies of a human user are recognized by an automatic speech recognition system. The answers given by the respondent are processed by the system in order to convert the spoken words to meaning, which can then be utilized interactively, or stored in a database.

In order for a computer system to recognize the words that are spoken and convert these words to text, the system must be programmed to phonetically break down the words and convert portions of the words to their textural equivalents. Such a conversion requires an understanding of the components of speech and the formation of the spoken word. The production of speech generates a complex series of rapidly changing acoustic pressure waveforms. These waveforms comprise the basic building blocks of speech, known as phonemes. Vowel and consonant sounds are made up of phonemes and have many different characteristics, depending on which components of human speech are used. The position of a phoneme in a word has a significant effect on the ultimate sound generated. A spoken word can have several meanings, depending on how it is said. Speech scientists have identified allophones as acoustic variants of phonemes and use them to more explicitly define how a particular word is formed.

While there are several distinct methods for analyzing the spoken word and extracting the information necessary to enable the recognition system to convert the speech to word-strings, including Hidden Markov modeling and neural networks, these methods generally perform similar operations. The differences in these methods are typically in the manner in which the system determines how to break the phonetic signal into portions that define phonemes. Generally, a speech recognition system first converts an incoming analog voice signal into a digital signal. The second step is called feature extraction, wherein the system analyzes the digital signal to identify the acoustic properties of the digitized signal. Feature extraction generally breaks the voice down into its individual sound components. Conventional techniques for performing feature extraction include subband coding Fast Fourier Transforms and Linear Predictive Coding. Once the signal has been analyzed, the system then determines where distinct acoustic regions occur. The goal of this step is to divide the acoustic signal into regions that will be identified as phonemes which can be converted to a textual format. In isolated word systems, this process is simplified, because there is a pause after each word. In continuous speech systems, however, this process is much more difficult, since there typically are no breaks between words in the acoustic stream. Accordingly, the system must be able not only to break the words themselves into distinct acoustic regions, but must also be able to separate consecutive words in the stream. It is in this step that conventional methods such as Hidden Markov modeling and neural networks are used. The final step involves comparing a specific acoustic region, as determined in the previous step, to a known set of templates in a database in order to determine the word or word portion represented by the acoustic signal region. If a match is found, the resulting textual word is output from the system. If one is not, the signal can either be dynamically manipulated in order to increase the chances of finding a match, or the data can be discarded and the system prompted to repeat the query to the respondent, if the associated answer cannot be determined due to the loss of the data.

In customer service applications, it is important for service providers to be able to obtain information from, or to provide information to, their customers. Oftentimes, service providers will need to contact customers via the telephone to obtain or provide the desired information. In order to reduce the costs associated with such information exchanges, many service providers utilize automated telephone calling devices to contact customers. While the automated telephone calling devices are extremely capable of converting spoken words into text phrases and thereby obtaining valuable information from respondents, in some cases, the respondents are not capable of providing adequate responses to the posed questions, or do not understand what is involved in an automated telephonic application. Prior art speech recognition applications are not able to identify that the respondent is having trouble with the application and then adjust the application accordingly. This results in wasted time and money for the company in charge of the survey and in frustration on the part of the respondent.

SUMMARY OF THE INVENTION

The present invention is directed to a method for adaptive training of a respondent to a telephonic speech recognition application. The method is used in connection with the speech recognition application to enable the administrator of the application to explain the function of the application, to train the respondent in how to effectively respond to the queries in the application and to adapt the application to the needs of the respondent, based on the initial responses given by the respondent.

According to one aspect of the invention, a method of conducting a telephonic speech recognition application is disclosed, including:

A. making telephonic contact with a respondent;
B. presenting the respondent with at least one introductory prompt to reply to;
C. utilizing a speech recognition algorithm to process the audio responses given by the respondent to determine a level of capability of the respondent;
D. based on the audio responses, presenting the respondent with one of:
   at least one prompt associated with an application; and
   an explanation of the operation of the speech recognition application.

The explanation may include at least one of a sample prompt and instructions on responding to the at least one prompt of the application.

According to another aspect of the invention, a system for conducting a telephonic speech recognition application is disclosed, including:

an automated telephone device for making telephonic contact with a respondent; and
a speech recognition device which, upon the telephonic contact being made, presents the respondent with at least one introductory prompt for the respondent to reply to; receives a spoken response from the respondent; and performs a speech recognition analysis on the spoken response to determine a capability of the respondent to complete the application;

wherein, if the speech recognition device, based on the spoken response to the introductory prompt, determines that the respondent is capable of competing the application, the speech recognition device presents at least one application prompt to the respondent; and wherein, if the speech recognition device, based on the spoken response to the introductory prompt, determines that the respondent is not capable of completing the application, the speech recognition system presents instructions on completing the application to the respondent.

BRIEF DESCRIPTION OF THE DRAWINGS

The foregoing and other objects of this invention, the various features thereof, as well as the invention itself may be more fully understood from the following description when read together with the accompanying drawings in which.

DETAILED DESCRIPTION

As set forth above, many customer-oriented organizations, including retail operations, service organizations, health care organizations, etc. rely on interactions with their customers in order to obtain valuable information that will enable the organizations to optimize their operations and to provide better service to the customers. Telephonic speech recognition applications, in which specific prompts about the organization's products or services, 'enable the organizations to obtain information from customers' in a manner which consumes very little time and which does not require repeat visits to the organization's location. For many organizations, these types of interactions are much less troublesome for customers who might have difficulties in traveling.

While speech recognition ns can be an extremely efficient way to gather information from respondents, if the respondent is not able to respond to the prompts of the survey or does not understand the survey process or how to respond to certain types of queries, the process can be frustrating for respondent, thus inhibiting future interactions with the respondent, and the process can be costly and time consuming for the organization providing the service.

The present invention includes a method and system for determining whether a respondent is capable of responding to the prompts in a telephonic speech recognition application and what extra explanations or instructions, with modified application functionality, might be required to assist the respondent in completing the application. The method is incorporated into the application, and responses to introductory prompts of the application direct the application to present prompts to the respondent that will enable the respondent to learn how to correctly complete the application.

Figure 1:
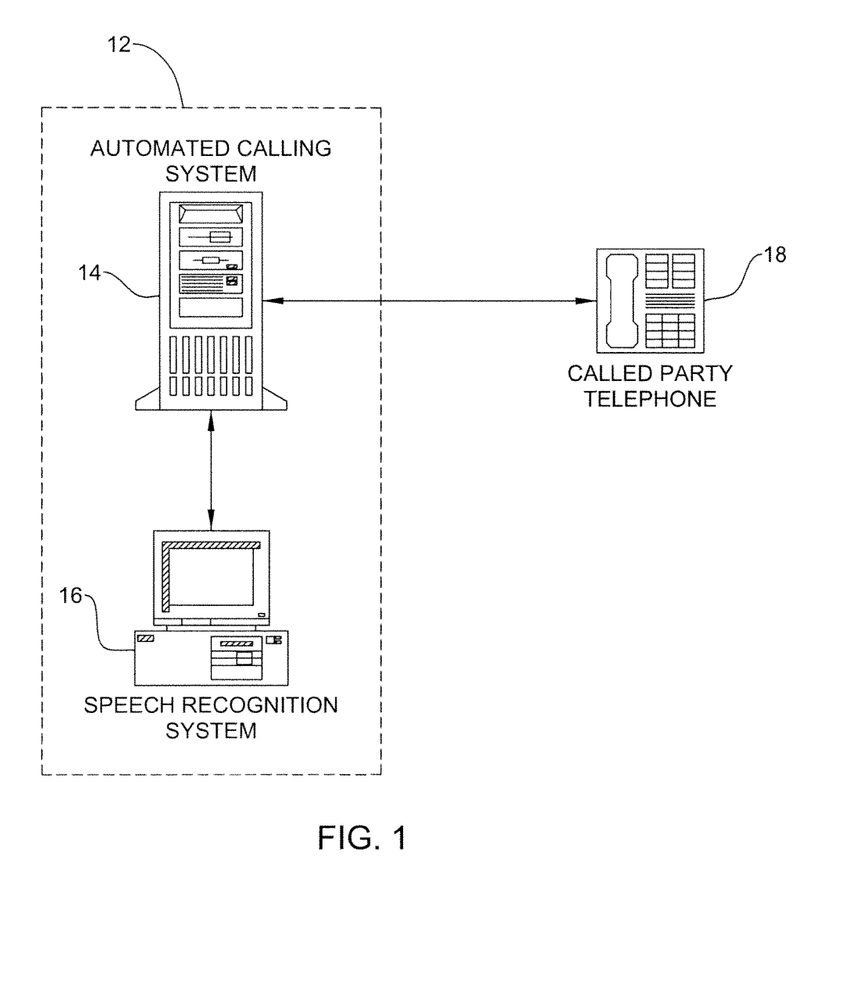
FIG. 1 is a schematic block diagram of the system for providing adaptive respondent training in accordance with the present invention.
Figure 2:
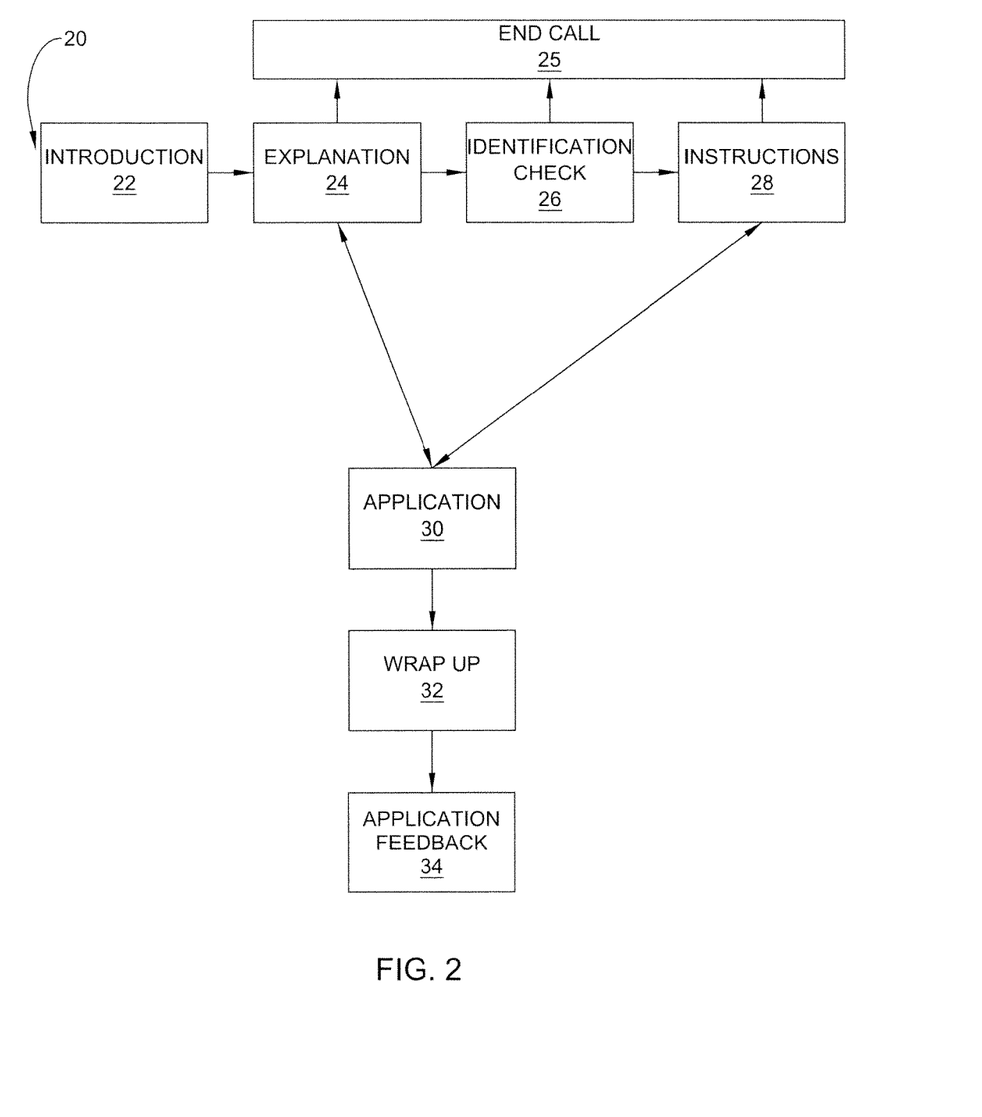
FIG. 2 is a flow diagram of a method for providing adaptive respondent training in accordance with the present invention.
Figure 3A:
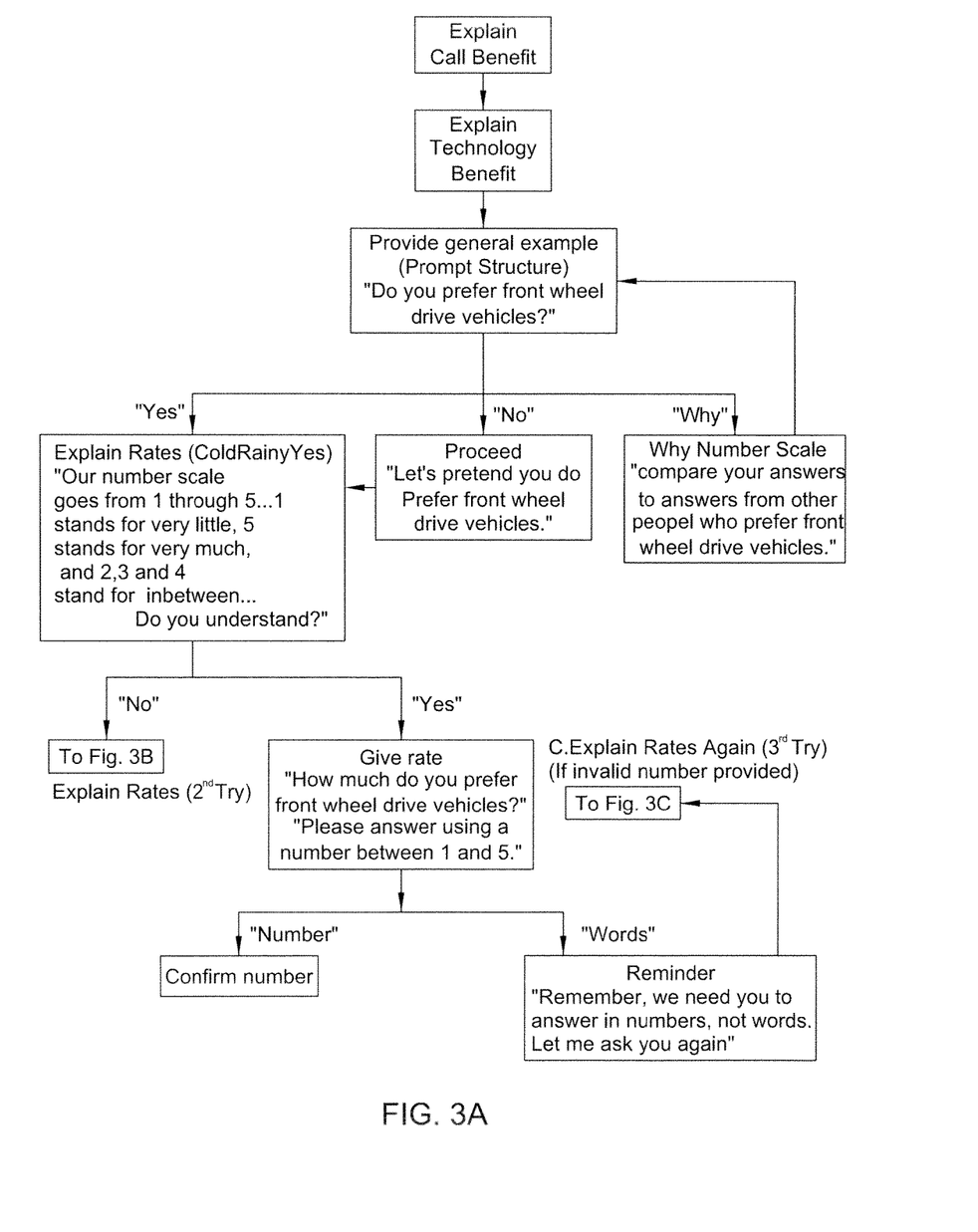
FIGS. 3A-3C are flow diagrams showing an example of the instruction stage of the present invention.
Figure 3B:
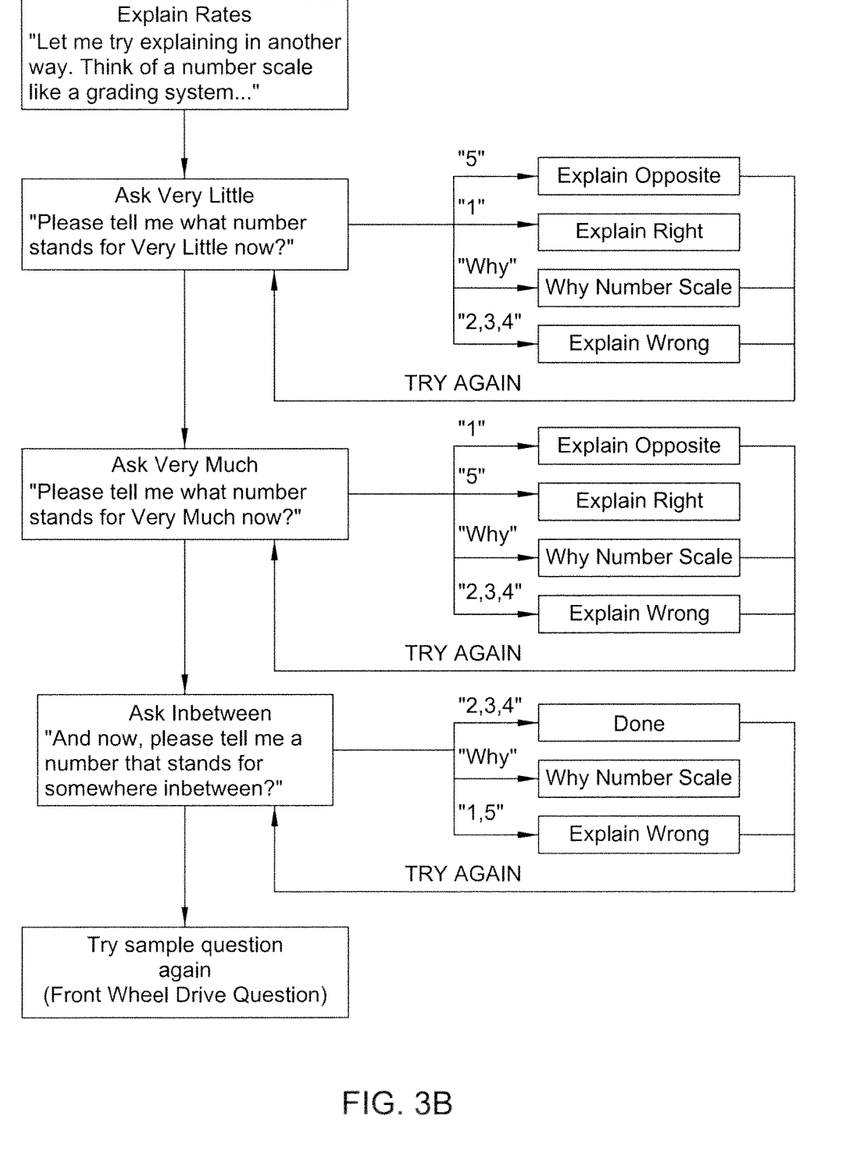
Figure 3C:
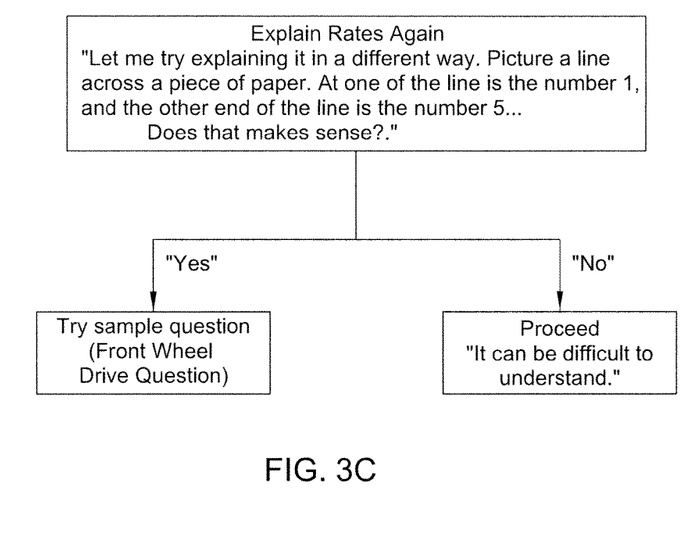

Referring now to FIGS. 1-3, a preferred embodiment of the present invention will be described. System 12, FIG. 1, includes an automated telephone calling system 14 and a speech recognition system 16. Preferably, the automated telephone calling system 14 is a personal computer such as an IBM PC or IBM PC compatible system or an APPLE MacINTOSH system or a more advanced computer system such as an Alpha-based computer system available from Compaq Computer Corporation or SPARC Station computer system available from SUN Microsystems Corporation, although a main frame computer system can also be used. In such a system, all of the components of the system will reside on the computer system, thus enabling the system to independently process data received from a respondent in the manner described below. Alternatively, the components may be included in different systems that have access to each other via a LAN or similar network. For example, the automated telephone calling device 14 may reside on a server system which receives the audio response from a telephone 18 and transmits the response to the speech recognition device 16.

The automated telephone calling system 14 may also include a network interface that facilitates receipt of audio information by any of a variety of a networks, such as telephone networks, cellular telephone networks, the Web, Internet, local area networks (LANs), wide area networks (WANs), private networks, virtual private networks (VPNs), intranets, extranets, wireless networks, and the like, or some combination thereof. The system 10 may be accessible by any one or more of a variety of input devices capable of communicating audio information. Such devices may include, but are not limited to, a standard telephone or cellular telephone 18. Automated telephone calling system 14 includes a database of persons to whom the system 12 is capable of initiating or receiving telephone calls, referred to hereinafter as the "target person", a telephone number associated with each person and a recorded data file that includes the target person's name. Such automated telephone calling devices are known in the art. As is described below, the automated telephone calling system 14 is capable of initiating or receiving a telephone call to or from a target person and playing a prerecorded greeting prompt asking for the target person. The system 14 then interacts with speech recognition system 16 to analyze responses received from the person on telephone 18.

Speech recognition system 16 is an automated system on which a speech recognition application, including a series of acoustic outputs called prompts, which comprise queries about a particular topic, are programmed so that they can be presented to a respondent, preferably by means of a telephonic interaction between the querying party and the respondent. However, a speech recognition application may be any interactive application that collects, provides, and/or shares information. As examples, in the present invention, a speech application may be any of a group of interactive applications, including consumer service or survey applications; Web access applications; customer service applications; educational applications, including computer-based learning and lesson applications and testing applications; screening applications; consumer preference monitoring applications; compliance applications, including applications that generate notifications of compliance related activities, including notifications regarding product maintenance; test result applications, including applications that provide at least one of standardized tests results, consumer product test results, and maintenance results; and linking applications, including applications that link two or more of the above applications.

In the preferred embodiment, each speech recognition application includes an application file programmed into the speech recognition system 16. Preferably, the series of queries that make up the application is designed to obtain specific information from the respondents to aid in customer or consumer service, education and research and development of particular products or services or other functions. For example, a particular speech application could be designed to ask respondents specific queries about a particular product or service. The entity that issues the application may then use this information to further develop the particular product or service. An application may also be used to provide specific information to a particular person or department.

FIG. 2 is a flow diagram which shows the method of adapting a speech recognition application and training a speech recognition application respondent in order to enable the respondent to effectively complete the application. First, either the automatic calling system 14 initiates a call to the target person at telephone 18, or the target person initiates a telephone call to the system 12 based on information provided to the respondent by the organization providing the application. The system 12 initiates the application by providing an introduction to the respondent, stage 22. The introduction generally identifies the host organization and informs the respondent of the purpose of the application.

In stage 24, the system 12 provides a brief explanation of the application, including the fact that the respondent is speaking to a computer that is only capable of posing queries, recognizing certain of the respondent's responses The system then prompts the respondent to affirm that he or she understands how to interact with the system 12. This prompt enables the system 12 to determine if the respondent is capable of interacting with an automated speech recognition system. Based on the response given, the system determines which step will be executed next. If the respondent replies quickly with a "yes" or some similar affirmation, the system may move on to the identification check, stage 26, in which the respondent is asked to provide identification, typically in the form of a personal identification number (PIN), voice verification, or other method. While the use of a PIN is desirable in application surveys that address private matters concerning the respondent, the use of a PIN is not required in the present invention.

If the respondent answers "no" or does not respond to affirmation request in stage 24, the system 12 explains in greater detail how the system operates. The system prompts the respondent to answer "Hello" to a similar greeting offered by the system, as a training exercise for the respondent. If the respondent replies correctly, the system can repeat the explanation of the system and proceed to the identification stage 26. If the respondent is does not reply to the greeting request or replies with a reply that is not understood by the system 12, the system can initiate several more attempts at, and approaches to trying to explain the process to the respondent, including attempting to determine whether the respondent is having difficulty hearing the application, in which the system 12 would be instructed to increase the volume of the prompts and/or to slow the speed at which the prompts are played by the system 12. If the system is unable to teach the respondent how to respond to the application, the system enters an end call stage 25, in which the respondent is thanked and optionally informed that they will be contacted by a human being, and the call is terminated.

In optional identification stage 26, the respondent is asked for identification, which in one example may include a PIN. If the PIN is correctly input either by speaking the numbers or by pressing the number on the telephone keypad, the application moves to the instruction step 28. If the respondent enters an incorrect PIN or does not know his or her PIN, the system enters an end call stage 25, in which the respondent is thanked and optionally informed how they can obtain a proper PIN, and the call is terminated.

After the identity of the respondent has been confirmed in step 26, the system enters instruction stage 28. In instruction stage 28, the system 12 explains the purpose of the application and the benefits provided by the application. The system 12 explains the structure of the application and informs the respondent of what types of answers are necessary for the application to be successful. The system 12 can then provide a sample prompt to the respondent in order to prepare the respondent for what to expect during the actual application. If the survey includes a rating system, it is explained in this stage and the sample question can require an answer that uses the rating system. An example of this process in shown in FIGS. 3A-3C, which include an example question and the options available, depending on the responses given. If, in this stage, the respondent is unable to answer the sample prompt satisfactorily, the system enters an end call stage 25, in which the respondent is thanked and optionally informed that they will be contacted by a human being, and the call is terminated.

After stage 28 has been completed satisfactorily, the system enters stage 30, in which the prompts of the application are presented to the respondent. At any point during stage 30, if the respondent does not understand the process or becomes confused by the application, prompts or rating system, the system 12 can re-enter either or both of explanation stage 24 and instruction stage 28 to provide help for the respondent, as necessary. The system 12, when appropriate, can then return to survey stage 30 to complete the application. During the application, the system records each of the responses provided by the respondent for review at a later time.

At the completion of the application, the system enters a "wrap up" stage 32 in which the respondent is informed that the survey is over and is thanked by the host organization for participating in the application. Application feedback stage 34 provides an opportunity for the respondent to have his or her comments regarding the application itself or regarding the speech recognition application system recorded for review by the host organization.

Accordingly, the present invention enables the system 12 both to train the respondent in properly responding to the prompts of the associated application and to alter the course of the application based on responses to introductory and explanatory prompts. For example, if the respondent, from the beginning of the call, understands the application process and is capable of responding to the prompts, the explanation stage 24 and instruction stage 28 can be quickly navigated through, saving time and money for the host organization, since more respondents can be processed in a given period of time. On the other hand, if the respondent is having difficulty understanding or hearing the system 12, the system is able to offer further explanations, training and sample prompts and, if the person is still not able to complete the survey, the system 12 is able to terminate the application.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

The invention claimed is:

1. A method of conducting an automatic telephonic speech recognition application comprising:
    initiating, with the automatic telephonic speech recognition application, a telephone call with a respondent;
    producing, with the automatic telephonic speech recognition application, at least one introductory auditory prompt, the at least one introductory auditory prompt requesting an auditory response from the respondent;
    analyzing, with a speech recognition algorithm, the auditory response provided by the respondent;
        determining an interaction capability of the respondent based on the analyzed auditory response;
    providing, with the automatic telephonic speech recognition application and based on the interaction capability of the respondent, the respondent with at least one auditory prompt associated with an application, including an explanation of an operation of the automatic telephonic speech recognition application, the explanation being based on the interaction capability of the respondent and enabling the respondent to provide an auditory response to the at least one auditory prompt associated with the application; and
        prompting, in response to the explanation of the operation of the speech recognition application, the respondent to confirm understanding of the explanation via a query.

2. The method of claim 1 wherein the explanation includes at least one of a sample prompt, demonstration, or instruction.

3. The method of claim 1, wherein the interaction capability of the respondent is determined by a compatible auditory response.

4. The method of claim 3, wherein the compatible auditory response is an acceptable value from a plurality of acceptable values.

5. The method of claim 3, wherein the compatible auditory response is in a predetermined format.

6. The method of claim 1, further comprising:
    providing, in response to the explanation of the operation of the speech recognition application, a training exercise for the respondent.

7. The method of claim 1, wherein the introductory auditory prompt is about one of a product, service, person, department, or opinion.

8. The method of claim 1, further comprising:
    asking, with the automatic telephonic speech recognition application, an identity of the respondent; and
    verifying, with the automatic telephonic speech recognition application, the identity of the respondent.

9. The method of claim 1, further comprising:
    storing in a database, by the automated telephonic speech recognition application, a user response to the at least one auditory prompt associated with an application.

10. A system for conducting an automatic telephonic speech recognition application comprising:
    an automated telephone device for initiating a telephone call with a respondent; and
    a speech recognition device configured to, upon the telephone call being initiated, present the respondent with at least one introductory auditory prompt requesting an auditory response from the respondent; receive the auditory response from the respondent; and perform a speech recognition analysis on the auditory response to determine an interaction capability of the respondent to complete the application;
    wherein, the speech recognition device upon a determination, based on the auditory response to the introductory auditory prompt, that the respondent is capable of completing the application, is configured to present at least one application auditory prompt to the respondent; and
    wherein, the speech recognition device upon a determination, based on the auditory response to the introductory auditory prompt, that the respondent is not capable of completing the application, is configured to present an explanation to the respondent, the explanation being based on the interaction capability of the respondent and enabling the respondent to provide an auditory response to the at least one application auditory prompt associated with the application,
    wherein the speech recognition device is further configured to prompt, in response to the explanation on completing the application, the respondent to confirm understanding of the explanation via a query.

11. The system of claim 10 wherein the explanation includes at least one of a sample prompt, demonstration, or instruction.

12. The system of claim 10, wherein the interaction capability of the respondent is determined by a compatible auditory response.

13. The system of claim 12, wherein the compatible auditory response is an acceptable value from a plurality of acceptable values.

14. The system of claim 12, wherein the compatible auditory response is in a predetermined format.

15. The system of claim 10, wherein the speech recognition device is configured to provide, in response to the explanation on completing the application, a training exercise for the respondent.

16. The system of claim 10, wherein the introductory auditory prompt is about one of a product, service, person, department, or opinion.

17. The system of claim 10, wherein the speech recognition device is further configured to ask for an identity of the respondent; and verify the identity of the respondent upon receiving the identity from the respondent.

18. The system of claim 10, further including a dataset, and wherein the speech recognition device is configured to store a user response to the at least one application auditory prompt in the database.

* * * * *